Jan. 7, 1936.                G. W. BAUGHMAN                2,027,222
                              ELECTRIC CABLE
                          Original Filed June 4, 1930

INVENTOR
George W. Baughman.
BY
HIS ATTORNEY

Patented Jan. 7, 1936

2,027,222

UNITED STATES PATENT OFFICE 2,027,222

ELECTRIC CABLE

George W. Baughman, Pittsburgh, Pa., assignor to The Union Switch & Signal Company, Swissvale, Pa., a corporation of Pennsylvania Original application June 4, 1930, Serial No. 459,223. Divided and this application June 28, 1934, Serial No. 732,866

5 Claims. (Cl. 175—320)

My invention relates to electric cables, and has for an object the provision of a new and improved circuit arrangement in which a cable of novel construction may be associated with other electrical apparatus in such manner as to avoid the possibility of false operation of such apparatus in the event of a grounded conductor.

I will describe a few forms of cables, and one system of circuits using such cables and embodying my invention, and will then point out the novel features thereof in claims.

Figure 1:
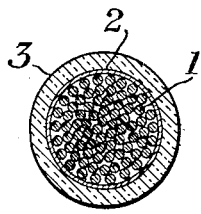
Figure 2:
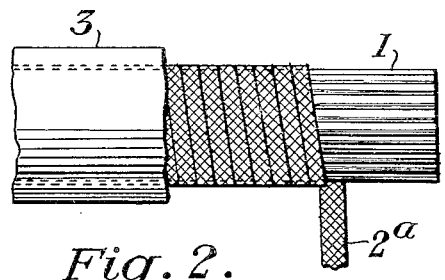
Figure 4:
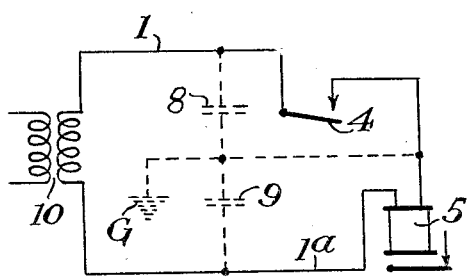
Figure 3:
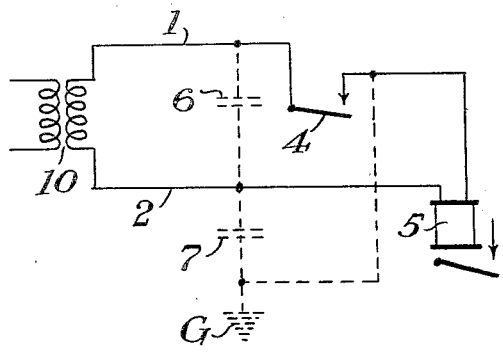
Figure 5:
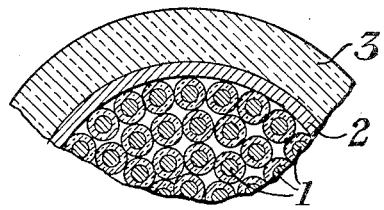
Figure 6:
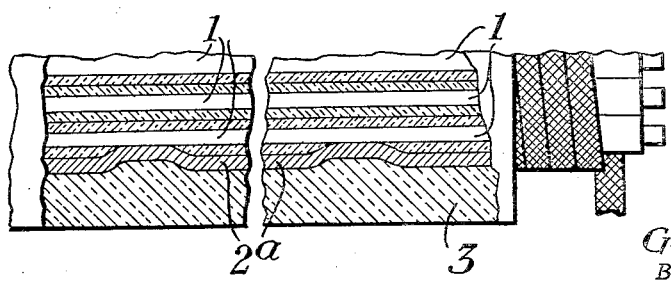

In the accompanying drawing, Fig. 1 is a transverse sectional view showing one form of cable for use in the circuit system embodying my invention. Fig. 2 is a longitudinal view, partly sectioned, showing a modified form of the cable shown in Fig. 1. Fig. 3 is a diagrammatic view showing one form of a circuit system including a cable embodying my invention. Fig. 4 is a diagrammatic view showing the conditions which may exist when cables of the usual form are utilized in the apparatus shown in Fig. 3. Fig. 5, which is an enlarged sectional view of a portion of the cable illustrated in Fig. 1, shows more clearly the insulation surrounding the individual conductors 1. Fig. 6, which is an enlarged sectional view of a modified form of the cable illustrated in Fig. 2, shows the manner in which the enclosing or shielding conductor 2a can be electrically connected with one of the usual longitudinal conductors 1 which serves to carry the return current for the remaining conductors.

Similar reference characters refer to similar parts in each of the views.

The present application is a division of my copending application Serial No. 459,223, filed June 4, 1930, for Electric cables.

Referring first to Fig. 1, the cable comprises the usual longitudinal conductors 1, and an additional conductor 2 in the form of a cylinder enclosing the conductors 1. The conductor 2 is enclosed in the usual insulation 3.

Referring now to Fig. 2, the cable in the form here shown, is the same as that shown in Fig. 1, except as to the structure of the cylindrical conductor 2. This conductor, which is here indicated 2a, is made by winding a metallic tape around the longitudinal conductors 1, the turns of the tape preferably being overlapped so that no additional inductance is introduced by this conductor. If desired, the conductor 2a may be made by winding two spiral layers of tape in opposite directions around the conductors 1.

Referring now to Fig. 3, the conductors 1 and 2 are connected with a source of alternating current 10, and a relay 5 is also connected across these conductors through a contact 4. It follows that the relay 5 is energized or deenergized according as contact 4 is closed or open.

The standard practice at the present time is illustrated in Fig. 4, where the conductors 1 and 1a are two of the longitudinal conductors of a cable, these conductors being connected with a source of alternating current 10, and a relay 5 being connected across the conductors through the medium of a contact 4. With the apparatus shown in Fig. 4, if the right-hand terminal of relay 5 should become grounded at G, then the distribution of capacities in the cable may be represented by condensers 8 and 9. When the relay is grounded in the manner indicated, it is obvious that half of the difference of potential between conductors 1 and 1a will be impressed upon the relay 5 when contact 4 is open, so that the relay may become falsely energized under this condition. Referring again to Fig. 3, and assuming that the right-hand terminal of relay 5 becomes grounded, as before, it will be apparent that the two terminals of the relay are connected across a phantom condenser 7, one terminal of which is connected with conductor 2 and the other terminal of which is grounded, so that there is no difference of potential across the terminals of this condenser or the terminals of the relay 5. It follows that the ground cannot cause false energization of relay 5 when contact 4 is open. The capacity between conductors 1 and 2 is represented by a condenser 6, which, of course, has no effect on relay 5.

In cables embodying my invention, the cylindrical conductor 2 or 2a forms a shield to the electrostatic field between conductors 1 and the ground.

In the usual form of transmission cable, each longitudinal insulated conductor within the cable may be considered as one plate of a condenser in which the ground forms the other plate. Where a protective metallic sheath surrounds the wires of the cable, as is commonly the case, the interior surface of the sheath serves as the other condenser plate, or ground. Since the distance from the surface of a wire to the sheath wall is relatively small, and the dielectric constant of the interior cable insulation is appreciable, the electrostatic capacity of a wire to sheath may become appreciable, particularly in a long cable, wherein the above-mentioned plate areas become large.

If the cable has no metallic sheath, but is buried in moist ground, or conduit, the result will be similar, because the moist ground, or conduit will form the other condenser plate. If an aerial cable without sheath is assumed, the ground will again act as the other condenser plate, although in this case the magnitude of the capacity from a wire to ground will usually be small because of the relatively large separation.

Since in most signaling applications involving cables, the capacity from a wire to ground or sheath predominates, the inter-wire capacities of the wires comprising the cable have not been shown in Figs. 3 and 4, and will be neglected in the following more detailed explanation of the manner in which a cable of the usual type functions in a relay circuit, as compared with a cable embodying my invention.

In Fig. 4, the capacity of wire 1 to ground is represented by condenser 8, and the capacity from wire 1a to ground is represented by condenser 9. These capacities will not necessarily be of equal magnitude because the wires 1 and 1a will not necessarily have the same separation from the sheath, or ground, nor need the exposure of each wire to the sheath be the same. However, in many cases, the capacities 8 and 9 will be of the same order of magnitude. Therefore, the potential from wire 1a to ground may be considered to be roughly equal to the potential from wire 1 to ground, so that condenser 9 will frequently have approximately one half of the potential of source 10 impressed across it.

Should a control wire of relay 5 of Fig. 4 become accidentally grounded at a point beyond open contact 4, the potential across capacity 9 will be available for falsely energizing relay 5. Under certain conditions, depending upon the magnitude of the electrical constants, relay 5 may absorb the major portion of the potential of source 10, due to parallel resonance of the winding of relay 5 with capacity 9, and the potential across relay 5 may even exceed the potential of source 10, should series resonance occur between capacity 8 and the parallel combination of capacity 9 and winding of relay 5. When it is appreciated that relay 5 may control a vital traffic governing function, the urgent necessity of eliminating the effect of capacity 9 will become immediately apparent.

Up to the present time, it has been the practice to provide costly and elaborate ground detecting equipment to safeguard control relays such as 5 against false operation. However, by making use of the cable herein disclosed, the danger of false energization of relay 5 resulting from a grounded control wire is completely eliminated. As shown in Fig. 3, since the return conductor 2 is now the sheath, or is one of the longitudinal conductors electrically connected with the sheath, the distribution of capacity from the wires of this cable to ground is entirely different from that existing in Fig. 4. Capacities 8 and 9 of Fig. 4 disappear and are replaced by the single capacity 6 of Fig. 3, which capacity, as will be apparent from the drawing, is incapable of causing false energization of relay 5 with a control wire grounded. Since no potential exists between sheath 2 and ground, capacity 7 acting across relay 5 with a control wire grounded can cause no current to flow through the relay winding, and therefore false energization cannot result.

In some instances it may not be practicable to use the cylindrical conductor 2 or 2a for one side of electric circuits, and when this is so, approximately the same result may be obtained by using one of the longitudinal conductors 1 for this side of the circuit and connecting such longitudinal conductor with the cylindrical conductor at intervals after the manner indicated in Fig. 6, which shows electrical connections at spaced points along the cable length between the conductor 2a and one of the longitudinal conductors 1, which connections may be made more secure by soldering, if desired. The purpose of connecting the above longitudinal conductor with the cylindrical conductor at intervals is to insure continuity of the electrical connection between them against mechanical breakage either of this connection or of the cylindrical conductor. It should, however, be understood that the desirable results of the invention can be secured with but one such connection, the purpose being solely to bring the cylindrical conductor to the potential of such longitudinal conductor. If this is done, the cylindrical conductor may be made of very thin material, or even be made of wire mesh. When it is made of wire mesh the distance between adjacent wires in the mesh should not be greater than half the distance between the mesh and the outside of the surrounding insulation 3.

Although I have herein shown and described only a few forms of cable and systems embodying my invention, it is understood that various changes and modifications may be made therein within the scope of the appended claims without departing from the spirit and scope of my invention.

Having thus described my invention, what I claim is:

1. In combination, an electric cable comprising the usual longitudinal conductors, an additional conductor in the form of a cylinder enclosing said usual conductors; and a circuit including a source of current, one of said usual conductors, a contact, a relay and said cylindrical conductor; whereby said cylindrical conductor shields the electrostatic field of the usual conductor from the ground so that the relay will not be falsely energized by capacity if said usual conductor is grounded while said contact is open.

2. In combination, an electric cable comprising an inner conductor and an outer conductor enclosing said inner conductor in such manner as to provide an electrostatic shield therefor; and a circuit including a source of current, said inner conductor, a contact, a translating device, and said outer conductor; whereby said translating device will not be falsely energized by capacity if said inner conductor is grounded while said contact is open.

3. In combination, an electric cable comprising an inner conductor and an outer conductor in the form of a wire mesh enclosing said inner conductor in such manner as to provide an electrostatic shield therefor, a source of current connected across said two conductors, a contact, a translating device connected with said two conductors over said contact so as to receive current from said source, whereby said translating device will not be falsely energized by capacity if said inner conductor is grounded while said contact is open.

4. In combination, an electric cable comprising an inner conductor, conducting material surrounding said inner conductor but insulated therefrom and forming an electrostatic shield for said inner conductor, a return conductor in electrical contact with said conducting material of the electrostatic shield; and a circuit including a source of current, said inner conductor, a contact, a translating device, and said return conductor; whereby said translating device will not be falsely energized by capacity if said inner conductor is grounded while said contact is open.

5. In combination, an electric cable comprising an inner conductor, a return conductor enclosing said inner conductor but electrically insulated therefrom, waterproof insulation surrounding said return conductor, said return conductor being in the form of a wire mesh in which the distance between wires is not greater than half the distance between the mesh and the outside of the surrounding insulation, and a circuit including a source of current, said inner conductor, a contact, a translating device, and said return conductor, whereby said translating device will not be falsely energized by capacity if said inner conductor is grounded while said contact is open.

GEORGE W. BAUGHMAN.